M. TUELL.
Car-Spring
No. 828          Patented July 9, 1838
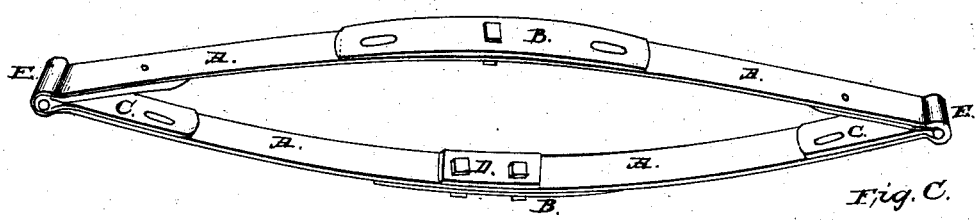
Fig. A.
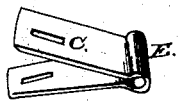
Fig. C.

UNITED STATES PATENT OFFICE.

MELZER TUELLS, OF PENN YAN, NEW YORK.

CONSTRUCTION OF ELLIPTIC SPRINGS FOR CARRIAGES, &c.

Specification of Letters Patent No. 828, dated July 9, 1838.

*To all whom it may concern:*

Be it remembered that I, MELZER TUELLS, of the village of Penn Yan, in the county of Yates and State of New York, have invented a new and Improved Elliptic Steel Spring for Coaches, Wagons, Carriages, Sulkies, and all other Vehicles to which the Same may be Applied; and I do hereby declare that the following is a full and exact description of the same.

The nature of my improvement consists in making the ends of the springs whole as represented by a draft hereunto annexed (Fig. A) and not with a joint or open at the ends according to the usual manner of making cliptic springs, and for the purpose of giving strength to the springs I add one or more leaves at the end to be made of one piece of steel and the end to be whole as is represented at the end of Fig. C, hereunto annexed.

To enable others skilled in the art to make and use my improvement I will proceed to describe its construction and operation. I construct the main or principal leaf of my elliptic steel spring of one entire piece of steel as represented by A, A, A, A, on the draft hereunto annexed, the ends E E to be whole and turn around a small rod or otherwise to suit convenience one or more center leaves as represented by B B. If the springs are made open in the center they are to be secured or fastened by two bolts and a plate as represented by the Fig. D. If a single leaf does not contain sufficient strength or power I add one or more leaves at each end, the end E to be whole as represented by Fig. C made similar to the principal spring and placed on the inner side by C, Fig. A.

In constructing springs after my mode with the ends whole and placing additional leaves at the ends the power or force is thrown to the end of the spring, by which mode the same force or strength will be obtained with less than one half the usual quantity of steel.

What I claim as my invention and desire to secure by Letters Patent is—

The improvement in making the steel elliptic springs for coaches, carriages, wagons, &c., by placing one or more additional leaves at the ends of the main leaf on the inner side as above mentioned and described so as to obtain the power of the springs at the ends.

MELZER TUELLS.

Witnesses:
HENRY M. STEWART,
GEORGE O. BACHMAN.